(No Model.) 2 Sheets—Sheet 1.

H. JAMES.
COMBINED HARROW AND PULVERIZER.

No. 498,273. Patented May 30, 1893.

(No Model.) 2 Sheets—Sheet 2.
H. JAMES.
COMBINED HARROW AND PULVERIZER.
No. 498,273. Patented May 30, 1893.
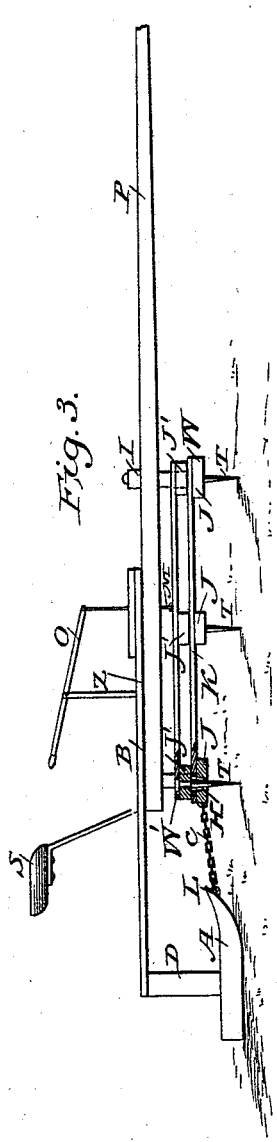
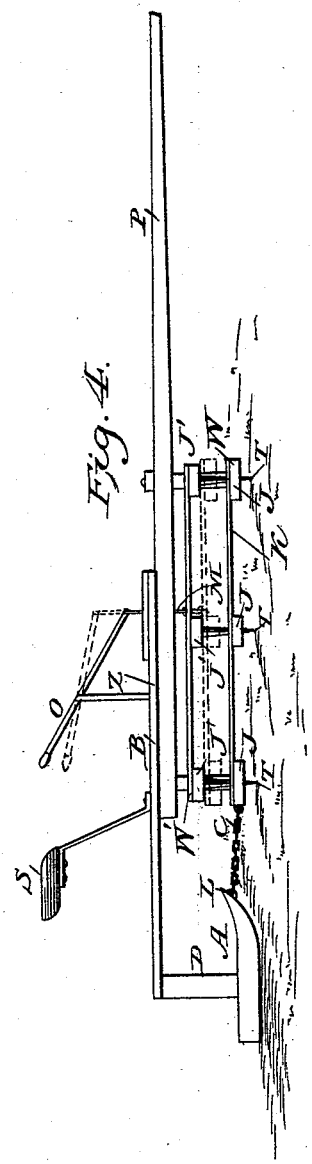
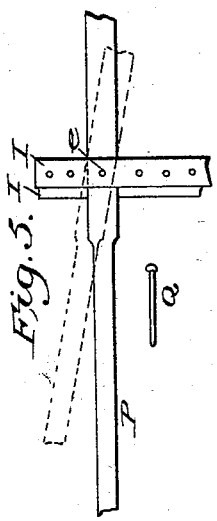

UNITED STATES PATENT OFFICE.

HOMER JAMES, OF SIOUX CITY, IOWA, ASSIGNOR, BY MESNE ASSIGNMENTS, TO CHURCH MEIGS AND R. SEARS.

COMBINED HARROW AND PULVERIZER.

SPECIFICATION forming part of Letters Patent No. 498,273, dated May 30, 1893.

Application filed July 16, 1891. Serial No. 399,793. (No model.)

*To all whom it may concern:*

Be it known that I, HOMER JAMES, a citizen of the United States, residing at Sioux City, in the county of Woodbury and State of Iowa, have invented certain new and useful Improvements in a Combined Harrow and Pulverizer; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to improvements in farming implements, and the object is to produce a riding toothed harrow and pulverizer combined, that operates to harrow, refine, and smooth the ground at the same time, so that once running over a piece of plowed ground with my invention, is equivalent to a separate harrowing and a separate pulverizing and smoothing, thus saving a large amount of time, and by permitting the operative to ride instead of walking, also saves a large amount of labor.

My invention therefore consists in the novel construction, arrangement and combination of the parts as will be hereinafter fully described, and particularly pointed out in the claim.

I have fully and clearly illustrated my invention in the accompanying drawings, wherein—

Figure 1:
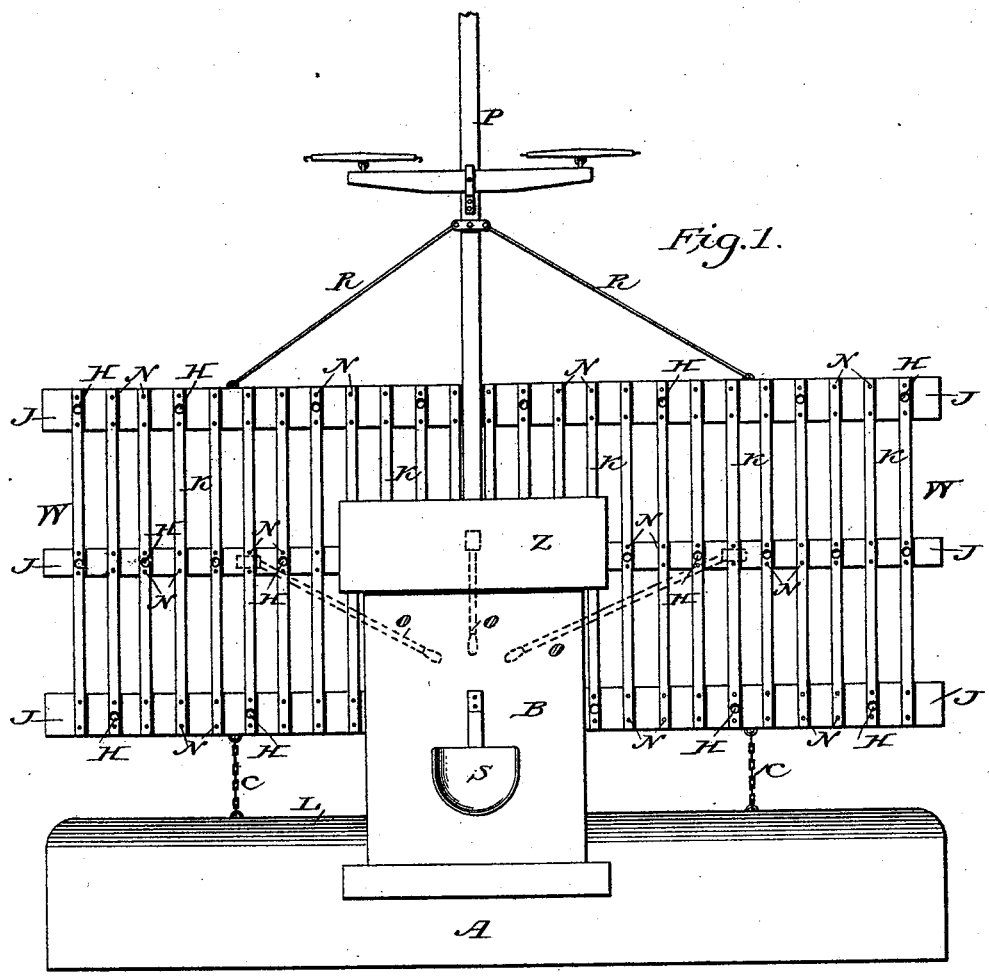
Figure 2:
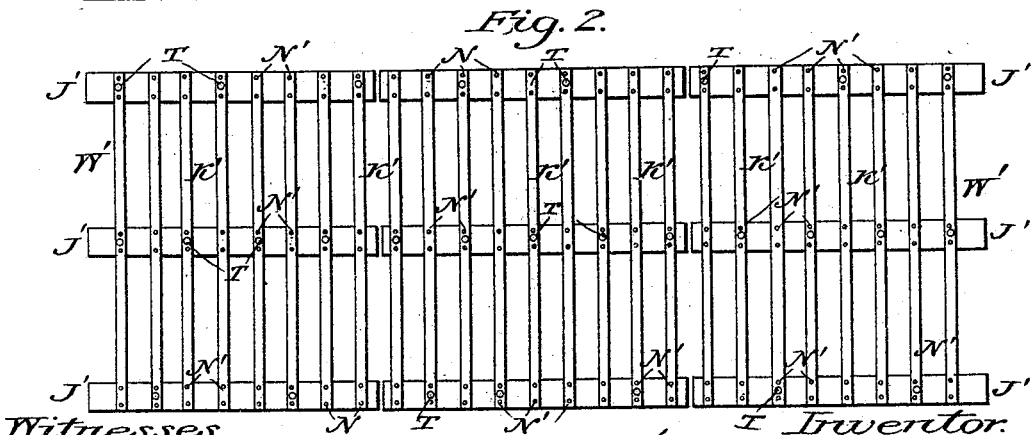

Figure 1 is a top view of my invention, showing the upper frame removed. Fig. 2 is a top view of the upper frame. Fig. 3 is a side view showing harrow teeth dropped full length for deep harrowing. Fig. 4 is a side view, showing harrow teeth raised for shallow harrowing. Fig. 5 is a view of uprights and adjustable pins, for adjusting the draft pole.

Referring now to these illustrations, wherein like parts are designated by similar letters of reference, in Fig. 1, W designates the main or lower frame of the harrow. This frame is made of three horizontal strips, as J, made of iron or other suitable material, to which, and at a right angle with said main strips, are riveted or bolted the cross strips, as K, by means of bolts, as N. These cross strips are also preferably made of iron. Openings or sockets, as H, are provided, one to each cross strip, located at the points shown in Fig. 1 in somewhat of an alternate manner, and extend through both cross strip and main strip, each making a pointed or oval shaped opening downwardly through the frame. These openings or sockets are intended to receive the harrow teeth secured in the frame W', which is adapted to fit over or upon the lower frame W. Levers as O, one for each section of the upper frame, as hereinafter shown, are secured to said frame at the points marked as M. P designates a draft pole of ordinary construction, provided with the ordinary cross bar and whiffle trees.

R R designate rods or braces extending from the lower frame W to draft pole P to keep said pole in position, and to secure a firm and equal draft on both sides of the frame.

A designates what is commonly known as a pulverizer, which is made of heavy wooden planking, having a smooth bottom surface, and provided at its forward edge with an upward turned lip, as L, to prevent the forward edge of the pulverizer from catching into sod, weeds, &c.

D designates a rest support for the rear part of floor B, to which it is rigidly secured.

B designates a wooden floor connecting the pulverizer with the harrow, and is provided with a seat of ordinary construction, as S. The forward part of floor B rests upon and is secured to the rest support Z, which rests in turn on uprights secured to frame W, so as to prevent the forward part of said floor from interfering with the raising of the center section of the upper frame W'.

c c designate chains used to connect the harrow and pulverizer.

In Fig. 2, W' designates an upper frame made similar to the lower frame W, except it is made in three separate sections, and instead of being provided with openings or sockets at the somewhat alternate intersections of the strips, is provided with pointed harrow teeth, securely bolted at their upper ends to said frame. These teeth are the same in number, and located exactly in the positions in the upper frame W' as the openings or sockets are in the lower frame W. The upper frame is intended to be placed on top of the lower frame, to constitute one device, but being shown separate in the drawings for a more specific explanation. When the upper frame W' (which is composed of three distinct sections, and which I designate as the upper frame for the purpose of clearer explanation) is placed on top of the lower frame W, the teeth of the upper frame designated as T fit into and pass down through the respective openings or sockets of the lower frame designated as H. This upper frame is made of iron, and may be of lighter construction than the lower frame. Each section is provided with a lever attached to the center of the section, each lever being adapted to raise its respective section from off the lower frame, and the teeth from out of the openings or sockets, to allow that section to pass over any sods, weeds, corn butts, &c., that may be in the way. The driver or operator from his seat is thus enabled to operate either section of the upper frame at his option, to keep the harrow teeth clear of any such foreign substance. In place of a lever, a ratchet bar or wheel may be used to raise and lower the sections, if desired. The weight of the operator being behind the harrow, but bearing upon it and also bearing upon the pulverizer, causes both harrow and pulverizer to do the more thorough work. The harrow going ahead, harrows the land, and the pulverizer follows, and refines and smooths it. The teeth may be dropped full length, as shown in Fig. 3, for deep harrowing, or only at partial length, as shown in Fig. 4, for shallow harrowing, the harrow being adapted to be altered to suit any crop desired.

Fig. 5 shows means for adjusting the draft pole. This pole is placed between the uprights I I, which have their lower ends secured in the center of the forward part of the lower frame, openings as E being provided in said uprights to receive suitable adjustable pins, as $q$. For deep harrowing, the pole is raised, and for shallow harrowing, it is lowered, between the uprights.

The operation of my device is readily perceived from the foregoing description. The upper frame being in place on the lower frame, the operation of harrowing, refining, and smoothing the ground will be accomplished as my invention passes along over the surface of the ground previously plowed, the weight of the operator tending to keep the teeth of the harrow and the lower surface of the pulverizer firmly in working condition. If the right hand section of the harrow comes in contact with any obstacles, as corn butts, weeds, sod, &c., the operator operates the right hand lever, causing that section with its teeth to be raised, and all obstacles to drop away from the teeth, and be passed over until reached by the pulverizer, which smooths them into a level with the soil. The left hand section and center section are each operated in a similar manner by their respective levers. The operator is thus permitted to harrow and pulverize all day without getting off his seat.

My invention has the following advantages over other inventions of this character, viz: It has an upper frame to which the teeth are secured, made in adjustable sections, each of said sections being adapted to be raised to allow that portion of the harrow to clear itself from sods or weeds, and each section is adapted to be lowered to drop the teeth into the sockets, so that the teeth will be full length on the under side, or at half length, as it may be desired, when deep or shallow harrowing is needed. This permitting of the raising or lowering of the teeth when desired is of marked importance, as some crops, like cereals, need only a shallow harrowing, while other crops require a much deeper harrowing. The teeth can be adjusted by means of the levers to suit any crop. Moreover, in removing the harrow from place to place, all the operator has to do is to rise the teeth, and my invention then presents a smooth bearing surface to move over the ground, thereby avoiding catching the harrow teeth into everything they come in contact with, and also preventing the jerking and twitching on the horses, that other harrows cause by such catching into foreign substances.

My invention being provided with a pulverizer with its forward edge turned upward, and being provided with a seat located as it is, the weight of the operative comes behind the harrow and bears downwardly toward the center of the central harrow section, causing the harrow to ride through any mass of sod or turf and to smooth or pulverize it, instead of riding over such mass, as a lighter toothed harrow would be likely to do.

My invention furthermore saves a great amount of time, one operation of it being equal to a separate harrowing and a separate pulverizing. It also is made so much simpler, and the harrow part being of iron, of only about eighteen inches in depth and about nine feet in breadth, with teeth every three inches apart, and the pulverizing part being of wood, the cost of material and construction is very much less than that of any other devices to effect the same results.

Having thus fully and clearly described my invention, what I claim, and desire to secure by Letters Patent, is—

The combination of the lower frame W, provided with openings, H, with the upper frame W', made in sections, each section being provided with teeth T, and a lever O, the pulverizer A, provided with the lip L, and connected with the lower frame by chains C C, the supporting pieces D and Z supporting the floor B, the seat S, rods R R, pole P, upright I I, and pin Q, all substantially as specified.

In testimony whereof I affix my signature in presence of two witnesses.

HOMER JAMES.

Witnesses:
GUY C. RICH,
T. H. WEHRING.